UNITED STATES PATENT OFFICE 2,647,087

IMPROVED CALCIUM FLUOROPHOSPHATE PHOSPHOR CONTAINING ALUMINUM

David F. Fortney, Towanda, Pa., assignor to Sylvania Electric Products Inc., Salem, Mass., a corporation of Massachusetts No Drawing. Application March 18, 1950, Serial No. 150,550

3 Claims. (Cl. 252—301.4)

This invention relates to halo-phosphate phosphors, and to fluorescent lamps using such phosphors.

I have discovered that the presence of a small amount of aluminum in such phosphors increases their luminous efficiency and thereby makes them more useful in lamps.

The aluminum may be added in a suitable compound to the raw material mixture before the mixture is fired at a high temperature in the usual process.

The raw materials, which may be, for example ammonium chloride, calcium carbonate, secondary calcium phosphate, manganese carbonate, antimony oxide and calcium fluoride, may be thoroughly mixed as fine powders and then fired at a high temperature, for example about 1090° C., as shown in the copending application Serial No. 115,551, filed September 13, 1949, now Patent No. 2,544,663, issued March 13, 1951, by David F. Fortney and Gerald L. Moran, for Phosphor Manufacture.

As shown in that application the materials may be mixed in the following proportions, for example:

Chloride, as ammonium chloride ($NH_4Cl$) _____ 0.35 gram-atom.
Calcium carbonate ($CaCO_3$) _ 1.35 mols.
Secondary calcium phosphate ($CaHPO_4$) _____ 3.00 mols.
Manganese, as manganese carbonate ($MnCO_3$) _____ 0.12 gram-atom.
Antimony, as antimony oxide ($Sb_2O_3$) _____ 0.12 gram-atom.
Fluoride, as calcium fluoride ($CaF_2$) _____ 0.76 gram-atom.

The above has been found to be very satisfactory proportions for a luminescent phosphor having an emission color generally known as 3500° White, that is one having an emission curve (against wavelength) roughly similar to a black body at 3500° K. Other colors will require different proportions. The gram-atom ratio of calcium plus manganese to phosphorus should be about 4.85 to 3.00 for maximum brightness, and a small increase in this ratio will greatly diminish the brightness of the resultant phosphor.

To the mixture before firing, I add or include a small percentage of aluminum, in any suitable compound, for example the oxide or a compound reducible to the oxide on heating, such as the hydroxide, acetate and the like. The percentage of aluminum, taken as the metal, is 0.01%, although amounts up to 0.10% may be used.

The ingredients are intimately mixed in the form of fine powders, for example, by starting with fine powders and milling the resultant mixture. They may then be fired, preferably in covered crucibles, at a temperature of about 1090° C. for six hours, then again broken down into powders and milled again if necessary.

For example, a test gave the following result, the control being a phosphor without aluminum:

| Addition | Initial | 100 Hours | 400 Hours |
|---|---|---|---|
| Control | 58.6 | 55.0 | 51.6 |
| 0.0001% | 58.6 | 54.4 | 51.8 |
| 0.001% | 61.2 | 56.8 | 54.6 |
| 0.010% | 61.4 | 58.8 | 56.0 |
| 0.10% | 60.8 | 57.8 | 54.4 |

A repeat test gave the following:

| Addition | Initial | 100 Hours | 400 Hours |
|---|---|---|---|
| Control | 59.2 | 55.2 | 54.4 |
| 0.0001% | 59.8 | 56.4 | 55.4 |
| 0.01% | 62.2 | 59.2 | 57.4 |

The percentages in the tests were taken, for convenience in terms of weight of aluminum, with respect to weight of the di-basic calcium phosphate in the mix. Since the latter was about 80% of the weight of the entire phosphor, the percentages would be only 80% as great in terms of the latter. The 0.0001% would be 0.00008%, the 0.001% would be 0.0008%, the 0.01% would be 0.008% and the 0.1% would be 0.08%. For convenience, the figures as to the whole phosphor are merely written "about 0.01%" and the like in the claims, instead of 0.08%, for example, because it is chiefly the order of magnitude that is important.

The tests were made by coating the inside surface of glass tubes, 48" long and 1½" in diameter, with the phosphor, sealing oxide-coated electrodes into each end of the tube in the usual manner, then evacuating the tube, filling it with argon at about 3 mm. of mercury pressure and adding a drop of mercury. The tubes were operated at 40 watts input, bringing the tube to a mercury pressure in the neighborhood of 10 microns, and placed on life test, on a cycle of three hours on and fifteen minutes off, for the number of hours indicated. This is a standard test.

What I claim is:
1. A calcium fluorophosphate phosphor ac- tivated by manganese and antimony containing about 0.01% aluminum.

2. A calcium fluorophosphate phosphor activated by manganese and antimony containing aluminum in an amount between about 0.001% and about 0.10%.

3. A calcium halophosphate phosphor comprising the fired reaction product of the following ingredients in the following proportions: about 0.35 gram-atom of ammonium chloride, about 1.35 mols of calcium carbonate, about 3 mols of secondary phosphate, about 0.12 gram-atom of antimony oxide, about 0.76 gram-atom of calcium fluoride, and between about 0.001% and 0.1% aluminum, taken by weight with respect to the amount of secondary calcium phosphate, the aluminum being in the form of a compound selected from the group consisting of aluminum oxide and aluminum compounds reducible to the oxide.

DAVID F. FORTNEY.

References Cited in the file of this patent
UNITED STATES PATENTS

| Number | Name | Date |
|---|---|---|
| 2,488,733 | McKeag | Nov. 22, 1949 |

OTHER REFERENCES

Journal of Electrochemistry, July 1949, vol. 96, No. 1, pp. 1–12.